(No Model.)
J. BURKE.
METHOD OF ELECTRICAL DISTRIBUTION.
No. 554,240. Patented Feb. 11, 1896.
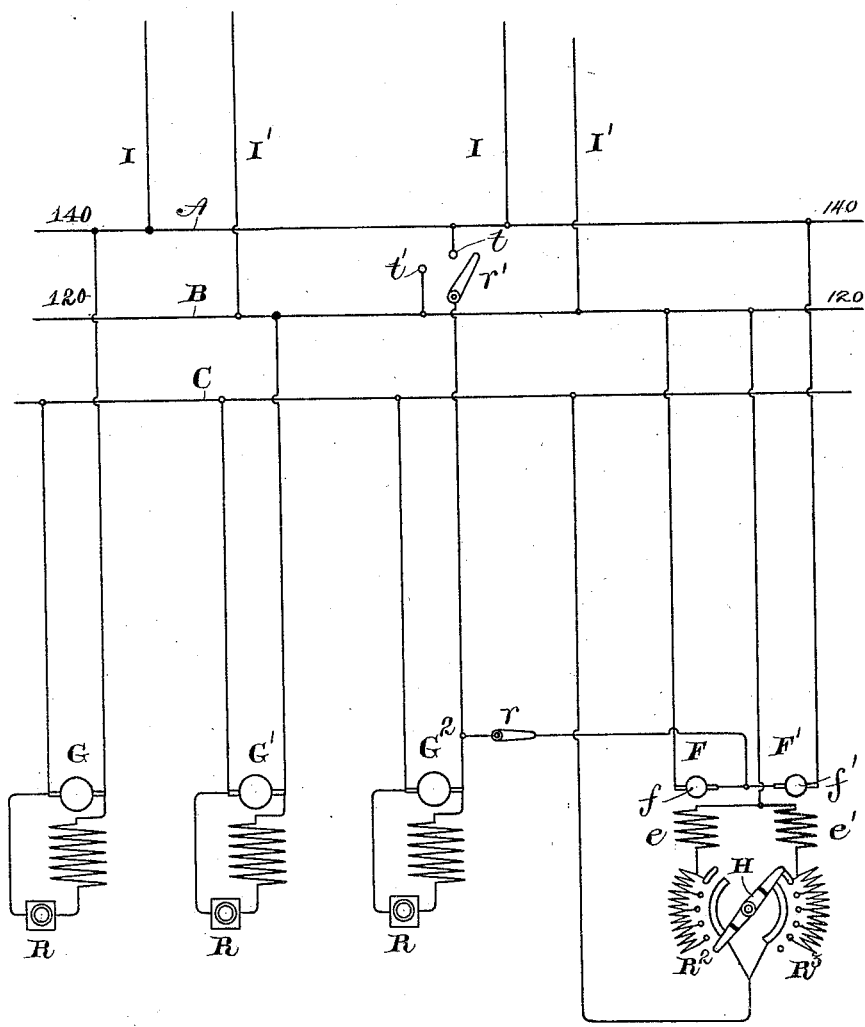
WITNESSES:
A. F. Macdonald.
R. B. Hull.
INVENTOR
James Burke
BY
Geo. R. Blodgett
ATTORNEY

UNITED STATES PATENT OFFICE.

JAMES BURKE, OF SCHENECTADY, NEW YORK, ASSIGNOR TO THE THOMSON-HOUSTON ELECTRIC COMPANY, OF BOSTON, MASSACHUSETTS.

METHOD OF ELECTRICAL DISTRIBUTION.

SPECIFICATION forming part of Letters Patent No. 554,240, dated February 11, 1896.

Application filed December 24, 1894. Renewed January 6, 1896. Serial No. 574,561. (No model.)

*To all whom it may concern:*

Be it known that I, JAMES BURKE, a subject of the Queen of Great Britain, residing at Schenectady, county of Schenectady, State of New York, have invented certain new and useful Improvements in Methods of Electrical Distribution, of which the following is a specification.

The present invention comprises a method and certain novel means for supplying from a single generator or group of generators current of different potentials in two or more electric circuits, or to such portions of a common distribution system as require a different potential on the feeders at the central station in order to compensate for the different amounts of drop in the feeders, which arise from causes well known to electrical engineers.

In central-distribution systems as now installed it is customary to employ bus-bars, maintained at any desired difference of potential, from which the feeders lead to different portions of the system. In such cases it often occurs that one or a group of feeders require more current than is supplied by the regular generators, so that a reserve machine must be used to supply the emergency. It has been impracticable heretofore to supply current from a single reserve machine or group of machines to more than a single bus-bar at a time, owing to the different potentials at which the bus-bars are normally maintained.

I have designed the present invention especially with a view to meeting this emergency and rendering it possible to divide the current from a single machine, supplying part of the current to one bus-bar or set of feeders at one potential, and the remainder of the current to other bus-bars or feeders at a different potential.

The invention will be described as applied to such a system of distribution, though it will also be found useful in many other connections, as will be understood by electrical engineers.

To illustrate a simple typical embodiment of the invention, assume a two-wire distribution system in which the positive feeders are connected to two bus-bars maintained at different potentials by generators of correspondingly different voltages, or other well-known means. If, then, it becomes desirable to supply additional current to these bus-bars from a supplementary or reserve machine the machine will be connected to the bus-bars through intermediate variable sources of electromotive force, whereby substantially all the current of the reserve machine may be supplied to either bus-bar at the proper potential, or the current may be divided between the two bus-bars at different potentials, corresponding to the normal values maintained thereon. To effect this division of the current I employ, preferably, a pair of dynamo-machines, with their armatures connected in series across the bus-bars and running in unison. One terminal of the reserve machine is then connected between the two armatures, while the negative terminal will be connected to the common negative bus-bar. The fields of the regulating-machines are energized with current from any suitable source of supply, and means are provided for regulating the electromotive forces of the machines inversely, so that the potential of the current supplied to one bus-bar may be raised and that supplied to the other bar may be lowered in any desired ratio.

The accompanying drawing shows in diagram a distribution system embodying the invention, such as has just been described.

A B represent the positive bus-bars of a two-wire distribution system, and C is the common negative bus-bar. I will assume that the standard potential maintained on the bus A is one hundred and forty volts and that on bus B is one hundred and twenty volts.

G G' are the main generators normally supplying current to the respective bus-bars.

$G^2$ represents an additional or reserve machine which may be used to help out either of the main generators or both of them at the same time. For this purpose its negative terminal is connected to the negative bus C, and its positive terminal is connected to the bus-bars A B through variable sources of electromotive force, comprising two dynamo-machines F F', arranged in the following manner.

The armatures $f\,f'$ of the machines are coupled in series between the bus-bars A B, and the generator $G^2$ is connected to a point between the armatures, as indicated. The field-windings $e\,e'$ of the machines may be energized by current derived from any suitable source. For this purpose I have shown them connected in multiple between the bus-bar B and the negative bus C. Resistances $R^2\,R^3$ are included respectively in the field-circuits $e\,e'$, and a rheostat-arm H is so arranged as to cut resistance into one circuit simultaneously with cutting it out of the other circuit.

The generators G G' $G^2$ are shown as shunt-wound and provided with rheostats R for regulation in the ordinary manner. The construction of these machines is, however, in no sense a material part of the invention. Feeders I and I' are shown leading from the respective bus-bars A B. By opening the switch $r$ and closing the switch $r'$ upon one or the other of contacts $t\,t'$ the generator $G^2$ may be thrown wholly upon either of the bus-bars when desired.

In a practical installation I should prefer to couple up the generators so that any one of the machines may either be connected to one of the common station bus-bars directly or coupled to both sets of busses through the machines F F'. This can be readily accomplished by suitable switches, as an electrical engineer will readily understand. The armatures of machines F F' will be mounted on the same shaft or so geared as to run in unison.

The operation of the invention will now be described.

If the conditions are such that substantially the total current of the dynamo $G^2$ is needed upon the bus B, the rheostat-arm H will be so thrown as to introduce a maximum amount of resistance in the field-circuit $e$, or preferably to break the circuit altogether. The machine F will then run idle, and except for ohmic losses there will be no difference of potential between its terminals, while, on the other hand, the field strength and counter electromotive force of machine F' is at a maximum, and the machine will absorb substantially all of the twenty volts normal difference of potential between the bus-bars A B. The generator $G^2$ will now be delivering current to the bus B at one hundred and twenty volts, it being understood that the machine is so regulated that its voltage is of substantially this value. If the rheostat-arm H be thrown to the other extreme position the conditions will be reversed. The machine F' will then run idle, and there will be practically twenty volts difference of potential between the terminals of the machine F. If the voltage of the generator $G^2$ is then raised to one hundred and forty it will deliver current to the bus-bar A at the proper potential.

If it is desired to divide up the current of the generator $G^2$ between the bus-bars A B, the rheostat-arm H will be so placed as to divide the total twenty volts difference of potential between the two armatures $f\,f'$ in the proper ratio. Assume that it is placed in the central position. Then there will be ten volts difference of potential between the terminals of each of the armatures $f\,f'$, and if the generator $G^2$ is properly regulated its current will divide equally between the bus-bars A B, the electromotive force in armature $f'$ acting to assist or boost up the voltage of the current delivered to bus A to one hundred and forty volts, and the electromotive force in armature $f$ acting to reduce or boost down the electromotive force of the current going to bus B to one hundred and twenty volts. In a similar manner, well understood, the current of the generator $G^2$ may be divided between the bus-bars in any desired ratio, and will be always supplied to the bars at the proper potentials.

The invention of course may be applied to more extended systems of distribution than that herein shown, comprising any number of bus-bars necessary in a given installation. It is also equally applicable to three-wire distribution systems, in which the only addition required would be to duplicate the arrangement described on the two sides of the system. For example, what is herein illustrated would, in a three-wire system, be proper for one branch of the system between the positive busses and the neutral bus, and the arrangement would be duplicated between the neutral bus and the negative busses.

Having thus described my invention, what I claim as new, and desire to secure by Letters Patent, is—

1. The combination of two or more circuits or portions of a distribution system, with means for maintaining thereon different potentials, sources of electromotive force connected between such circuits in series, whose sum is substantially equal to the difference of potential between the circuits, a generator connected at a point between the said sources of electromotive force, and feeding current through them respectively to the said first-named circuits, and means for regulating inversely the values of the said electromotive forces, as set forth.

2. The combination of two or more circuits or portions of a distribution system, with generators maintaining different potentials in such circuits, a number of dynamo-machines running in unison and coupled in series between the different potential circuits, and a source of current-supply connected at a point between the armatures of said machines and adapted to feed current to the first-named circuits at their respective potentials, as described.

3. The combination of a number of electric circuits or portions of a distribution system, at which different potentials are normally maintained, with a pair of dynamo-machines running in unison and connected across said circuits in series, a generator connected between the armatures of said machines and adapted to supply current to the circuits at their respective potentials, and means for simultaneously increasing the electromotive force in one such machine, and decreasing the electromotive force in the other machine, as set forth.

In witness whereof I have hereunto set my hand this 22d day of December, 1894.

JAMES BURKE.

Witnesses:
B. B. HULL,
GENEVIEVE HAYNES.